United States Patent [19]

Hsueh et al.

[11] Patent Number: 4,903,769

[45] Date of Patent: Feb. 27, 1990

[54] METHOD OF CONTROLLING PERMEABILITY DAMAGE OF HYDROCARBON FORMATIONS DURING STEAM INJECTION USING BICARBONATE IONS AND SOURCES OF AMMONIA

[75] Inventors: Liming Hsueh, Buena Park; Marion G. Reed, Hacienda Heights, both of Calif.

[73] Assignee: Chevron Research Company, San Francisco, Calif.

[21] Appl. No.: 278,908

[22] Filed: Dec. 2, 1988

Related U.S. Application Data

[63] Continuation of Ser. No. 132,519, Dec. 14, 1987, abandoned, which is a continuation-in-part of Ser. No. 97,254, Sep. 17, 1987, abandoned, which is a continuation of Ser. No. 909,971, Sep. 22, 1986, abandoned.

[51] Int. Cl.$^4$ .................... E21B 43/24; E21B 47/00; E21B 47/06
[52] U.S. Cl. .................... 166/272; 166/252; 166/303; 166/902
[58] Field of Search ............ 166/252, 272, 292, 300, 166/303, 305.1, 902

[56] References Cited

U.S. PATENT DOCUMENTS

| | | | |
|---|---|---|---|
| 3,193,009 | 7/1965 | Wallace et al. | 166/272 |
| 3,237,692 | 3/1966 | Wallace et al. | 166/303 |
| 3,543,858 | 12/1970 | Nooner et al. | 166/303 |
| 3,807,500 | 4/1974 | Thigpen, Jr. et al. | 166/303 |
| 4,475,595 | 10/1984 | Watkins et al. | 166/303 |
| 4,476,930 | 10/1984 | Watanabe | 166/310 X |
| 4,522,263 | 6/1985 | Hopkins et al. | 166/303 X |
| 4,572,296 | 2/1986 | Watkins | 166/303 |
| 4,572,297 | 2/1986 | Thigpen, Jr. et al. | 166/307 |
| 4,609,044 | 9/1986 | Lau | 166/272 X |
| 4,625,802 | 12/1986 | Sydansk | 166/300 |
| 4,714,112 | 12/1987 | Nigrini et al. | 166/252 |

*Primary Examiner*—George A. Suchfield
*Attorney, Agent, or Firm*—Edward J. Keeling

[57] ABSTRACT

A method for inhibiting permeability damage of a hydrocarbon formation containing clay minerals in the vicinity of a well penetrating the formation. It comprises: injecting a wet steam that includes (a) an amount of ammonia in the vapor phase of the wet steam to produce a concentration of ammonium ions in the vapor phase condensate of the wet steam effective to inhibit permeability damage of the formation in the vicinity of the vapor phase, and (b) an amount of a bicarbonate salt of the alkali metals, or mixtures thereof, effective to raise the liquid phase pH of the wet steam to within the range of about 7.5 to about 10.5.

2 Claims, No Drawings

METHOD OF CONTROLLING PERMEABILITY DAMAGE OF HYDROCARBON FORMATIONS DURING STEAM INJECTION USING BICARBONATE IONS AND SOURCES OF AMMONIA

CROSS-REFERENCE TO RELATED APPLICATIONS

This is a continuation of application Ser. No. 132,519, now abandoned, filed Dec. 14, 1987, which is a continuation-in-part of Application Ser. No. 97,254, now abandoned, filed Sept. 17, 1987, titled "Method of Controlling Permeability Damage of Hydrocarbon Formations During Steam Injection Using Ammonium Ions, Bicarbonate Ions, and Potassium Ions", which is a file wrapper continuation of application Ser. No. 909,971, now abandoned, filed Sept. 22, 1986, titled "Method of Controlling Permeability Damage of Hydrocarbon Formations During Steam Injection Using Ammonium Ions, Bicarbonate Ions, and Potassium Ions".

The present invention relates to a method for inhibiting permeability damage of a hydrocarbon formation containing clay minerals. Furthermore, the present invention relates to a method for simultaneously (1) preventing permeability damage to a hydrocarbon-containing formation which contains clay minerals; (2) preventing corrosion produced by an acidic liquid phase of wet steam resulting from acid overtreatment; and (3) improving the injectivity of steam into that formation.

BACKGROUND OF THE INVENTION

Steam injection techniques, such as steam stimulation and steam flooding, have been used to recover immobile heavy oils and to enhance the oil recovery from older wells where the natural field pressures are too low for unassisted production. They are designed to reduce the reservoir flow resistance by reducing the viscosity of the crude.

These techniques involve injection into the well of a high temperature wet steam in cycles of thousands of cubic meters at a time. Wet steam is a mixture of steam and varying amount of hot liquid water, the quality of wet steam generally ranging from 35% to 80%. Because of the density difference between the two phases of the wet steam, the vapor phase preferentially enters the upper part of the injection interval and the liquid phase preferentially enters the lower part.

When groundwater, river water, or lake water is used as feedwater to generate wet steam, the liquid phase of wet steam is generally basic (having a pH in excess of 11) and the vapor phase of the wet steam, when condensed, is acidic (having a pH of about 4.0 to 4.5). This partitioning is due to the bicarbonate contained in the source water decomposing to $CO_2$ and $OH^-$, as shown in Equation 1 below:

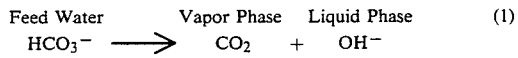

The $CO_2$ is volatile and enters the vapor phase, which produces a low pH in the liquids condensed from the vapor phase. The $OH^-$ ion stays in the liquid phase and causes a high pH in the liquid phase.

Associated with using these wet steams in steam injection is the problem of silica dissolution. Coupled with high fluid temperatures, both the liquid phase and the liquids from the condensed vapor phase are capable of rapidly dissolving reservoir rocks, such as sandstone, carbonate, diatomite, porcellanite and the like. For pH valves above 11.0 and temperatures above 177° C., the silica and silicate dissolution rates are orders of magnitude higher than at neutral/ambient conditions. Also, because the reactions for dissolving siliceous reservoir rocks are base consumers, the liquid pH decreases rapidly as the fluid moves away from the wellbore, causing the dissolution reactions and solubility to diminish rapidly and causing the reaction products (such as aluminosilicates and other metal silicates) to precipitate downsteam in the pores. This precipitation decreases the formation permeability and decreases well injectivity.

This problem of silica dissolution was addressed in U.S. Pat. No. 4,475,595; U.S. Pat. No. 4,572,296; and U.S. Pat. No. 4,580,633. All three of those patents are incorporated herein by reference for all purposes. U.S. Pat. No. 4,475,595 discloses adding an ammonium inhibitor to the feedwater or to the wet steam. U.S. Pat. No. 4,572,296 discloses adding an ammonium inhibitor and a compound which hydrolyzes in steam, providing a buffering effect in the liquid phase to prevent excessive pH reduction. U.S. Pat. No. 4,580,633 discloses adding an ammonium inhibitor and an organosilicon compound. In each case, the amount of added ammonium inhibitor is determined by the bicarbonate concentration of the steam.

Also associated with using these wet steams is the problem of permeability damage of hydrocarbon formations containing clay. Clay is a general term for minerals such as kaolinite, illite, chlorite, smectite, and mixtures thereof. Most of these minerals have a very distinctive, book-like structure made of pages of thin layers of hydrous aluminosilicates. During steam injection, the reaction of fresh water and some clay minerals behaves much like a soaking wet book: they swell, ripple, and break off. Some clay minerals swell to 600% to 1000% of their initial volume when subjected to fresh water during steam injection. This results in (1) reducing pore volume for fluid flow and (2) plugging pore channels from fines migration. The swelling of clay and the migration of clay fines severely inhibit steam injectivity into the formation. Formations that contain clay minerals are susceptible to fresh water injection that cause the clay to disperse and migrate. When fines move downstream, they tend to bridge in pore constrictions to form miniature filter-cakes throughout the pore network. This can decrease steam injectivity in the lower interval where liquid water is injected and also in the upper injection interval where vapor phase condensation takes place. In some cases, clay structural expansion may contribute to this decrease in permeability.

It is well known that clay minerals expand greatly when the interlayers are occupied by sodium ions. A sodium ion can absorb twelve or more irregularly oriented water molecules. If the interlayer sodium ions are replaced with ammonium ions, the swelling problem may be substantially reduced.

As previously discussed, ammonium salts have been used to control the pH of wet steam and decrease silica dissolution. But for a high-clay-content reservoir, the concentration of ammonium ions sufficient to remedy the silica dissolution problem is usually inadequate to reduce permeability damage produced by clay minerals.

U.S. Pat. No. 4,549,609 by Watkins et al, filed Aug. 15, 1984, which is hereby incorporated by reference, attempts to solve this problem. It teaches injecting an ammoniacal nitrogen-containing compound into the wet steam to reduce permeability damage. But this patent fails to address another problem associated with ammonia salt treatment.

To treat a high-clay reservoir, large amounts of ammonium salts must be added to the steam. Generally, this reduces the pH of the residual liquid phase of the wet steam to the 2.0–4.0 range. This acid overtreatment corrodes the steam generation and steam transportation system.

Accordingly, the need exists for a further improved steam injection treatment which simultaneously (1) prevents permeability damage to a hydrocarbon-containing formation which contains clay minerals; (2) prevents corrosion produced by an acidic liquid phase of the wet steam resulting from acid-overtreatment; and (3) improving the steam injection rate into the formation. It is the principle object of this invention to provide such a method.

SUMMARY OF THE INVENTION

The present invention provides a method for inhibiting permeability damage of a hydrocarbon formation containing clay minerals in the vicinity of a well penetrating the formation. It comprises: injecting a wet steam that includes (a) an amount of ammonia in the vapor phase of the wet steam to produce a concentration of ammonium ions in the vapor phase condensate of the wet steam effective to inhibit permeability damage of the formation in the vicinity of the vapor phase, and (b) an amount of a bicarbonate salt of the alkali metals, or mixtures thereof, effective to raise the liquid phase pH of the wet steam to within the range of about 7.5 to about 10.5.

In a preferred embodiment the wet steam further includes an amount of a salt of an alkali metal selected from the group consisting of potassium, rubidium, and cesium to form an alkali metal ion concentration in the liquid phase of the wet steam effective to inhibit permeability damage of the formation in the vicinity of the liquid phase of the wet steam.

The special alkali metal ions serve, in the vicinity of the liquid phase of the injected wet steam, to inhibit permeability damage and to improve the steam injectivity. Preferably, the concentration of special alkali metal ions in the liquid phase of the wet steam is from 0.01N to 2N, more preferably from 0.01N to 1N. Preferably, the source of special alkali metal ions is either potassium sulfate, potassium chloride, potassium acetate, potassium nitrate, potassium bicarbonate, potassium carbonate, or a mixture thereof. More preferably, that source is potassium chloride or potassium bicarbonate.

DETAILED DESCRIPTION OF THE INVENTION

In its broadest aspects, the present invention involves a method for inhibiting permeability damage of hydrocarbon formations containing clay minerals and for improving the injectivity of steam into those formations. The two areas of concern are (1) clay stabilization and silicate dissolution in the vapor condensation region and (2) clay stabilization in the liquid phase.

Clay Stabilization in Vapor Phase Condensation Region

Ammonium salts are highly effective for clay stabilization in the vapor phase condensation region. When the ammonium passes through the generator, it decomposes to ammonia and acid. The ammonia is an alkaline gas that partitions to the gas phase, the acid partitions to the liquid phase. This is opposite to the way bicarbonate decomposes, where the acid component partitions to the gas phase and the base component partitions to the liquid phase. When one adds an amount of ammonium salt chemically equivalent to the concentration of bicarbonate, both the liquid phase and the vapor phase condensate of the generator effluent are neutralized by the decomposition reactions, as shown by Equation 2 below.

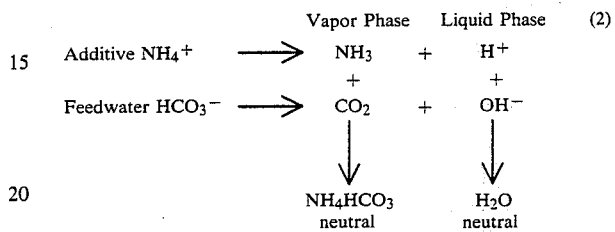

The ammonium ions at the point of vapor phase condensation help prevent permeability damage and maintain near neutral pH's on both the vapor phase condensation region and the liquid phase injection region.

In the present invention, a sufficient amount of a source of ammonium ions are added to the wet steam or feedwater to produce an ammonium ion concentration in the vapor phase condensate of the wet steam effective to inhibit permeability damage of clay mineral-containing hydrocarbon formations in the vicinity of the vapor phase of the injected wet steam and to improve the injectivity of the wet steam into the formation at the same location. Preferably, the ammonium ion concentration in the vapor phase condensate of the wet steam is less than 2N, more preferably, from 0.01N to 0.5N. Preferably, the source of ammonium ions is ammonium sulfate, ammounium chloride, ammonium hydroxide, ammonium acetate, ammonium nitrate, or mixtures thereof, more preferably either ammonium sulfate or ammonium chloride.

To determine the desired amount of ammonium ions, the preferred method is to take core samples in the region in question and determine the permeability of the core to solutions containing different ammonium ion concentrations, starting at the highest concentration. Permeability is plotted as a function of ammonium ion concentration. The results will be a curve of diminishing effect. Each added increment of ammonium ion concentration will give improved permeability, but the improvement will be smaller for each added increment. In other words, doubling the ammonium ion concentration will usually improve permeability, but not by double. The decision of a particular desired amount of ammonium ions is a trade-off between the cost of the added ammonium ions and the value of the increased permeability or the incremental value of hydrocrabon produced.

Normally, the amount of ammonium salts which can be added to feedwater is limited by the chemistry of feedwater. If the bicarbonate concentration is lower than the total ammonium concentration, decomposition of the excess ammonium can lower the pH of wet steam sufficiently to cause severe corrosion of steel tubular goods in the steam injection lines. When one wishes to add more ammonium to the feedwater than the amount can be neutralized by the bicarbonate in the feedwater, one adds a source of bicarbonate ions to feedwater to balance the over-corrected feedwater.

The bicarbonate ions serve to balance the over-corrected pH of the liquid phase and the vapor phase condensate of the wet steam, thereby preventing acidic corrosion of the well pipe. The source of bicarbonate ions is added to raise the pH of the liquid phase of the wet steam to within the range of from 7.5 to 10.5, preferably from 8.5 to 9.5. The source of bicarbonate ions can be sodium bicarbonate, potassium bicarbonate, and mixtures thereof. The preferred method of determining the amount of bicarbonate ions added is to (1) determine the desired amount of ammonium ions, (2) determine the amount of bicarbonate ions already in the feedwater, and then (3) calculate the equivalent amount of bicarbonate ions needed to adjust the pH to the desired level.

Clay Stabilization in the Liquid Phase

Many clay stabilizers, such as zirconyl salts, hydroxyaluminum, cationic polymers, quaternary ammonium salts and fluoboric acid, are available from commercial oil field service companies for use in the liquid phase. Because of the high cost of these chemicls, they are generally used to control clay problem within a very few feet of the wellbore.

The portion of the well receiving liquid phase water can be protected by maintaining a high total metal salt concentration in the injected liquid phase. Only alkali metals are practical because of precipitation and scaling problems associated with salts of polyvalent cations. Some of the alkali metal salts are especially effective because of their ion exchange with some caly minerals. This special group includes potassium, rubidium, and cesium salts, but of these potassium is preferred because of its cost and availability. Thus, chemical additions to feedwater for protecting the formation receiving the liquid phase is practically limited to potassium salts. It is important to note that these metal salts do not enter the vapor phase and therefore they do not protect the formation rock in the vapor phase condensation zone.

An amount of a source of special alkali metal ions is added to the wet steam or feedwater to form an ion concentration effective to inhibit permeability damage of hydrocarbon formations containing clay minerals in the vicinity of the residual liquid phase of the injected wet steam and to improve the injectivity of the wet steam into the formation in the vicinity of the liquid phase of the injected wet steam. Preferably, the special alkali metal ion concentration in the liquid phase of the wet steam should be from 0.01N to 2N, more preferably from 0.01N to 1N. The source of potassium ions can be potassium sulfate, potassium chloride, potassium acetate, potassium nitrate, potassium carbonate, or mixtures thereof.

To determine the desired amount of special alkali metal ions, the preferred method is to take core samples in the region in question and determine the permeability of the core different solutions containing potassium concentrations, starting at its highest concentration. Permeability is plotted as a function of potassium ion concentration. The results will be a curve of diminishing effect. The decision of a particular desired amount of potassium ions is a trade-off between the cost of the added potassium ions and the value of the increased oil produced as a results of the higher formation permeability.

In one embodiment of the present invention, there are three sources of ions: ammonium chloride to supply ammonium ions, potassium chloride to supply potassium ions, and sodium bicarbonate to supply bicarbonate ions. In that embodiment, the three sources are added into the boiler feed water that is used to generate the wet steam. Sufficient ammonium chloride is added to form an ammonium ion concentration in the vapor phase condensate of the wet steam of from 0.01N to 0.5N. Sufficient potassium chloride is added to form a potassium ions concentration in the liquid phase of the wet steam of from 0.01N to 1N. Sufficient sodium bicarbonate is added to maintain the pH of the liquid phase of the wet steam to within the range of from 8.5 to 9.5.

In another embodiment, there are only two sources of ions: ammonium chloride to supply ammonium ions, and potassium bicarbonate to supply both potassium ions and bicarbonate ions. In that embodiment, the two sources are added into the boiler feed water used to generate the wet steam. Sufficient ammonium chloride is added to form an ammonium ion concentration in the vapor phase condensate of the wet steam of from 0.01N to 0.5N. Sufficient potassium bicarbonate is added to form a potassium ions concentration in the liquid phase of the wet steam of from 0.01N to 1N and to maintain the pH of the liquid phase of the wet steam to within the range of from 8.5 to 9.5. While this embodiment has the advantage of eliminating the need for a third source of ions, it is limited by the cost and availability of potassium bicarbonate.

Oxygen in the feedwater to the steam generator cannot be tolerated since severe corrosion will occur. A chemical oxygen scavenger, such as sodium sulfite, should be used in the feedwater to keep the oxygen concentration in the feedwater below 30 ppb.

Additives which are liquid at ambient temperatures can be added directly either to the boiler feedwater or to the steam itself. If added to the steam, the addition can be made either at the surface as the steam is being injected into the formation or down a well penetrating the formation to be treated, or the additive can be injected downhole via a separate coduit and mixed with the steam downhole prior to its entering the formation. Additives which are solids at ambient temperature can be added directly to the feedwater or a concentrated solution thereof can be prepared and then employed as described above for a liquid additive.

If one of the chief objectives in the application of this treatment to an enhanced oil recovery method is to use steam to mobilize oil which otherwise would be difficult to recover, the amount of steam to be used is well known in the art and is the same as for steam treatments in general.

While the applicants do not wish to be bound by any particular theory as to how their invention works, it is thought that the following theory may account for the observed beneficial results of the present invention. Most clay minerals are made up of layers. Between those layers are potassium ions that are not very exchangeable. During steam injection, those ions are slowly removed and are replaced by sodium ions. Those sodium ions have a relatively high hydration energy, so water molecules also go in between the layers with the sodium ions. The hydrated sodium ions are much larger than the potassium ions they replace, and, being larger, they force the layers apart. This leads to particles breaking off and generates fines. The migration of fines frequently causes plugging up the flow channels downstream. Ammonium and potassium ions have much lower hydration energies than sodium ions and so they have a much smaller effective radius than the hydrated sodium ions in aqueous solutions, thus they do not cause as much damage to clays.

EXAMPLES

The invention will be further illustrated by the following example which sets forth particularly advantageous methods and composition embodiments. While the example illustrates the present invention, it is not intended to limit it.

A field test was conducted in which mixed salts (ammonium chloride, sodium bicarbonate, and potassium chloride) were added to the feedwater in a steam stimulation cycle. The main objective of this test was to improve the injection rate of steam. Ammonium and potassium ions are used to control pH and to prevent formation damage respectively.

The experimental setup consisted of a chemical injection system to inject oxygen free mixed salt solution, a pH monitor system, and a static mixer before the generator to obtain a homogenous solution prior to heating. A dedicated generator was used to obtain a steady flow of steam during injection.

Two concentrated salt solutions were injected with the feedwater. The first solution contained 50 lb/bbl of ammonium chloride (2.42M). The second solution had 80 lb/bbl of potassium chloride (2.86M) and 15 lb/bbl of sodium bicarbonate (0.56M). The first solution was injected at a mass flow rate ratio of about one to 70. The second solution was injected at a mass flow rate ratio of about one to 270. The concentrations of ammonium chloride and potassium chloride for clay stabilization were based primarily on economics. Sodium sulfite was added to the solutions for oxygen scavenging.

Before injecting into the feedwater line, the concentrated solutions were passed through 5-micrometer filters to separate any particulate matter in the solution. The mixture of the salt solutions and the feedwater was passed through a static mixer to obtain a homogeneous solution and to prevent pockets of high concentration ammonium chloride solution from entering the generator. A small fraction of the liquid phase was passed through a condenser to cool it to ambient temperature before measuring pH.

The actual ammonium chloride flow rate during the beginning of the test was adjusted until the desired pH was obtained. During this period steam was discharged into the sump. After the pH of the liquid effluents had stabilized at the desired value, injection into the well was begun. The chemical pump rates were manually adjusted, when needed. The water supply was relatively steady and no major adjustment in the pump settings were required once the pH had reached the desired steady value.

The liquid phase pH reading, the steam quality, and the flow rates (of water and the injected chemicals) and the wellhead pressure were monitored and recorded throughout the test. The production rates were also monitored during the production cycle of the test.

The injection cycle for the test lasted for about 12 days. Approximately 10,000 barrels (cold water equivalent) of steam was injected into the well during this period. The average injection rate during the test was about 800 B/D CWE. The ammonium chloride solution was injected at the rate of 125 gal/day and the potassium chloride and sodium bicarbonate solution was injected at the rate of 500 gal/day. The injection rates remained fairly steady throughout the test. The pH of the steam liquid phase remained fairly constant between 9 and 9.5 during the test. The steam quality ranged between 40 to 60% during most of the test.

The wellhead injection pressure varied between 640 to 800 psi. This is significantly lower than that which is generally encountered in this sand for the same flow rate. Typically for steam injection without any additives, the injection pressure for this sand ranges from 800 to above 1000 psi. This indicates that the addition of mixed salts improved the injectivity by more than 20%. Furthermore, injectivity did not change significantly during the test, indicating that the continuous clay treatment using potassium and ammonium chloride was effective.

What is claimed is:

1. A method for inhibiting permeability damage of a hydrocarbon formation containing clay minerals in the vicinity of a well penetrating said formation comprising injecting a wet steam that includes:
    an amount of ammonia in the vapor phase of said wet steam resulting from the addition of anyhydrous ammonia to the wet steam to produce a concentration of ammonium in the vapor phase condensate of the wet steam effective to inhibit permeability damage of the formation in the vicinity of said vapor phase; and
    an amount of bicarbonate salt of the alkali metals, or mixtures thereof, effective to raise the liquid phase pH of the wet steam to within the range of about 7.5 to about 10.5.

2. A method for inhibiting permeability damage of a hydrocarbon formation containing clay minerals penetrated by an injection well and a production well comprising injecting into said injection well a wet steam that includes:
    an amount of ammonia in the vapor phase of said wet steam resulting from the addition of anhydrous ammonia to the wet steam to produce a concentration of ammonium in the vapor phase condensate of the wet steam effective to inhibit permeability damage of the formation in the vicinity of said vapor phase;
    an amount of a bicarbonate salt of the alkali metals, or mixtures thereof, effective to raise the liquid phase pH of the wet steam to within the range of about 7.5 to about 10.5 and producing hydrocarbons from said production well.

* * * * *